United States Patent [19]
Ziegler et al.

[11] Patent Number: 5,608,590
[45] Date of Patent: Mar. 4, 1997

[54] GIMBALLING FLEXURE WITH STATIC COMPENSATION AND LOAD PRINT INTREGAL ETCHED FEATURES

[75] Inventors: David A. Ziegler; Ryan A. Jurgenson, both of Hutchinson; Brent D. Lien, Minneapolis; Thomas K. Christensen; James R. Mahoney, both of Hutchinson, all of Minn.

[73] Assignee: Hutchinson Technology Incorporated, Hutchinson, Minn.

[21] Appl. No.: 263,605

[22] Filed: Jun. 20, 1994

[51] Int. Cl.⁶ .......................... G11B 5/48; G11B 21/16; G11B 15/64; G11B 17/32
[52] U.S. Cl. .......................... 360/104; 360/103; 360/109
[58] Field of Search ........................... 360/104, 103, 360/109

[56] References Cited

U.S. PATENT DOCUMENTS

| | | | |
|---|---|---|---|
| 4,724,500 | 2/1988 | Dalziel | 360/104 |
| 4,876,623 | 10/1989 | Takekado | 360/104 |
| 5,019,931 | 5/1991 | Ohwe et al. | 360/104 |
| 5,079,660 | 1/1992 | Yumura et al. | 360/104 |
| 5,282,103 | 1/1994 | Hatch et al. | 360/104 |
| 5,321,568 | 6/1994 | Hatam-Tabrizi | 360/104 |
| 5,331,489 | 7/1994 | Johnson et al. | 360/104 |
| 5,367,419 | 11/1994 | Kazama | 360/104 |
| 5,381,288 | 1/1995 | Karam, II | 360/104 |
| 5,434,731 | 7/1995 | Hagen | 360/104 |

FOREIGN PATENT DOCUMENTS

| | | |
|---|---|---|
| 93309023.5 | 11/1993 | European Pat. Off. . |
| 62-65275 | 3/1987 | Japan . |
| 63-90084 | 4/1988 | Japan . |
| 2-19867 | 3/1990 | Japan . |
| 3-16069 | 1/1991 | Japan . |

*Primary Examiner*—Frank Gonzalez
*Assistant Examiner*—Adriana Giordana
*Attorney, Agent, or Firm*—Faegre & Benson

[57] ABSTRACT

A gimbal and corresponding head suspension assembly including a planar flexure platform having integral static attitude compensation, nominal angle adjustment, and load point etched or etched-formed raised features. The head suspension assembly can also include a load point cover with etched or etched-formed load point features. The etched features are manufactured by masking a pivot point at about the intersection of the roll axis and the pitch axis, thus leaving a raised protuberance having either a pivot point or a load point feature. The process of manufacturing etched-formed features includes etching protuberances and slots. A punch press is then applied to the protuberances. The slots help control the formation of raised domes and provide additional static compensation and nominal angle adjustment pivoting clearance.

7 Claims, 12 Drawing Sheets

GIMBALLING FLEXURE WITH STATIC COMPENSATION AND LOAD PRINT INTREGAL ETCHED FEATURES

BACKGROUND OF THE INVENTION

Standard head suspension assemblies (HSAs) include, as component elements, a base plate, a load beam, a gimbal flexure and a head assembly. The load beam is an elongated metal spring structure. The base plate is attached to a proximal end of the load beam, and can be configured for mounting the load beam to an actuator arm of a disk drive. The gimbal flexure is positioned on a distal end of the load beam. Mounted to the gimbal flexure is a head assembly, which is thereby supported in read/write orientation with respect to an associated disk. The head assembly comprises a read/write transducer attached to an air bearing structure called a slider.

HSAs suspend the "flying" head assembly nanometers away from the surface of a rotatable data storage device (a spinning disk). The gimbal flexure provides gimballing support, that is, the gimbal flexure positions and maintains the head assembly at a desired flying attitude, a predetermined angle and height in relationship to the disk surface. The static attitude of the head assembly, the position of the head assembly at rest, is calibrated so that when the disk drive is in operation, and the slider is affected by the lifting force of the air stream caused by the rotation of the disk, the head assembly reaches an optimal dynamic attitude (position of the head assembly during operation).

To counter the air lift pressure exerted on the slider during disk drive operation, a predetermined load is applied through a load point feature on the suspension assembly to a precise point on the slider. The head flies above the disk at a height established by the equilibrium of the suspension force on the load point and the lift force of the air stream.

A conventional gimbal flexure, sometimes referred to as a Watrous gimballing flexure design, is formed from a single sheet of material and includes a pair of outer flexible arms about a central aperture and a cross piece extending across and connecting the arms at a distal end of the flexure. A flexure tongue is joined to the cross piece and extends from the cross piece into the aperture. A free end of the tongue is centrally located between the flexible arms. The head assembly is mounted to the free end of the flexure tongue.

For optimum operation of the disk drive as a whole, during attachment of the slider to the flexure tongue, the mounting surface datum (to which the load beam is mounted during HSA assembly) and the slider air bearing surface datum must be at a predetermined orientation with respect to each other (desired relationship). The mounting surface datum and the slider air bearing surface datum are level surfaces used as reference points or surfaces in establishing the desired relationship of the actuator mounting surface and the slider air bearing surface relative to each other (nominal angle). The upper and lower surfaces of the slider are manufactured according to specifications requiring them to be essentially or nominally parallel to each other.

During the process of manufacturing and assembling the HSA, any deviations caused by lack of precision in forming or assembling the individual elements contributes to a lack of planarity in the surfaces of the elements. A buildup of deviations from tolerance limits in the individual elements causes deviation from the desired relationship. The parameters of static roll and static pitch torque in the HSA result from these inherent manufacturing and assembly tolerance buildups. The load point feature of common gimbals does not compensate or help correct these tolerance deviations.

Static roll torque and static pitch torque have their rotational axes about the center of the head slider in perpendicular planar directions, and are caused by unequal forces acting to maintain the desired relationship on the slider while the head assembly is flying over the disk. That is, static torque is defined as a torque or a moment of force tending to cause rotation to a desired static (i.e., reference) attitude about a specific axis.

As applied to a HSA, the longitudinal axis of the slider is coincident with the longitudinal axis of the load beam and of the HSA. The axis of roll torque is coincident with the longitudinal axis of the HSA. The value of static roll torque is measured on either surface of the static roll torque axis when the flexure tongue is parallel with the base plate. If the flexure has been twisted about the static roll torque axis during manufacture (i.e., there is planar non-parallelism of the flexure tongue with respect to the disk along the roll torque axis), the values measured on either surface of the roll torque axis will not be the same. Thus, when the attached slider is in flying attitude to the associated disk surface, force (referred to as an induced roll torque value) is needed to twist the tongue back into desired relationship alignment to the disk.

The axis of pitch torque is perpendicular to the longitudinal axis of the HSA. The value of static pitch torque is measured on either surface of the static pitch torque axis when the flexure tongue is parallel with the base plate. If the flexure has been twisted about the static pitch torque axis during manufacture (i.e., there is planar non-parallelism of the flexure tongue with respect to the disk along the pitch torque axis), the values measured on either surface of the pitch torque axis will not be the same. Thus, when the attached slider is in flying attitude to the associated disk surface, force (referred to as an induced pitch torque value) is needed to twist the tongue back into parallel alignment to the disk. It will of course be understood that in actual static and dynamic attitude conditions the flexure can be twisted with respect to both axes, requiring alignment about both the pitch axis and the roll axis.

These torques can also be referred to in terms of static attitude at the flexure/slider interface and in terms of the pitch and roll stiffness of the flexure. The ideal or desired pitch and roll torques are best defined as those which would exist if the components were installed in an ideal desired relationship configuration in a disk drive. In an actual disk drive, pitch and roll static torques produce adverse forces between the air bearing surface of the slider and the disk, affecting the flying height of the slider above the disk, resulting in deviations from optimum read/write transducer and head assembly/disk interface separation.

In the static attitude of a conventional flexure design, the flexure tongue is offset from the flexure toward the slider to allow gimballing clearance between the upper surface of the slider and the lower surface of the flexure. The offset is formed where the flexure tongue and cross piece join, in conjunction with the dimple that is formed on the flexure tongue. Prior art dimples do not allow pivoting pitch and roll adjustments and act solely as load point features. The standard flexure design evidences a low value of pitch stiffness and a moderate value of roll stiffness. Pitch stiffness and roll stiffness are each measured in (force×distance)/degree.

Thus, in developing a new design for a flexure, it would be most desirable achieve a precise method of fabrication and accurately compensate and correct for manufacturing variations that currently contribute to static pitch and roll torque errors. The manufacturing process should be efficient to perform corrections for static roll torque, as well as for static pitch torque, since the ability to correct for both static torques is needed for proper flexure/slider alignment. Ideally, the manufacturing process should also result in accurate and simple placement of the load point feature.

Formation of pressure-formed surface features, such as dimples or depressions, present accuracy difficulties. To increase manufacturing efficiency and ease of assembly, the number of additional components in a the flexure, especially small, delicate components, is preferably reduced. Additional elements add complexity to the manufacturing process and present placement accuracy concerns. Only precise location of a load point feature allows precise location of the slider flying surface; as the dimple load point shifts from nominal the slider has a tendency to not fly in the proper orientation relative to the disk due to the torque resulting from the off-center load force. Thus, the manufacturing process of the ideal gimbal flexure should use very accurate manufacturing techniques and reduce the number of additional manufacturing steps and added elements.

SUMMARY

The present invention is an improved gimbal and corresponding head suspension assembly (HSA) that use etched integral features to provide nominal angle adjustment, static attitude compensation, and a precise load point feature alignment. The present gimbal is efficient to manufacture and minimizes the use of separate components. The use of a very precise etching or etching-shaping process results in extremely accurate positioning of critical gimbal points for static attitude compensation pivotting and load point features.

The head suspension assembly (HSA) comprises a suspension assembly and a head assembly. The suspension assembly is comprised of a gimbal assembly and a longitudinal spring element that has at least a portion stiffened into a load beam.

The present gimbal design includes a gimbal flexure platform supported by gimbal spring arms. The platform has a slider engaging first surface and a second surface. During manufacturing, the platform is chemically etched out of a plate of stainless steel. During etching, a first raised protuberance is left at full or slightly reduced thickness on the first surface facing the slider. The first protuberance offers a precisely located slider contact point.

The slider of the head assembly attaches to the first surface of the flexure platform against the first protuberance. The protuberance provides a pivot feature for compensating adverse pitch and roll torques resulting from pitch and roll static errors during manufacture and assembly and for providing nominal angle adjustment (adjusting the head assembly at a desired orientation).

In another embodiment of the invention the gimbal assembly also includes a bearing cover extending past the load beam and over the second surface of the flexure platform. The cover can be an extension of the load beam or a separate piece. The cover extends over the flexure platform and presses against the platform at a bearing point that defines the pivot point of gimbal pitch and roll axes. The cover has an etched protuberance that acts as a load point feature to exert pressure on the slider. Different embodiments include round pressed dimples and raised protuberances combinations on the flexure platform and on the cover.

In still another embodiment, the flexure platform includes a first and a second integral aligned protuberances rising from the first surface and the second surface respectively. While the first protuberance acts as a static attitude compensation and nominal angle adjustment feature, the second protuberance acts as a load point feature.

DETAILED DESCRIPTION OF THE INVENTION

Figure 1:
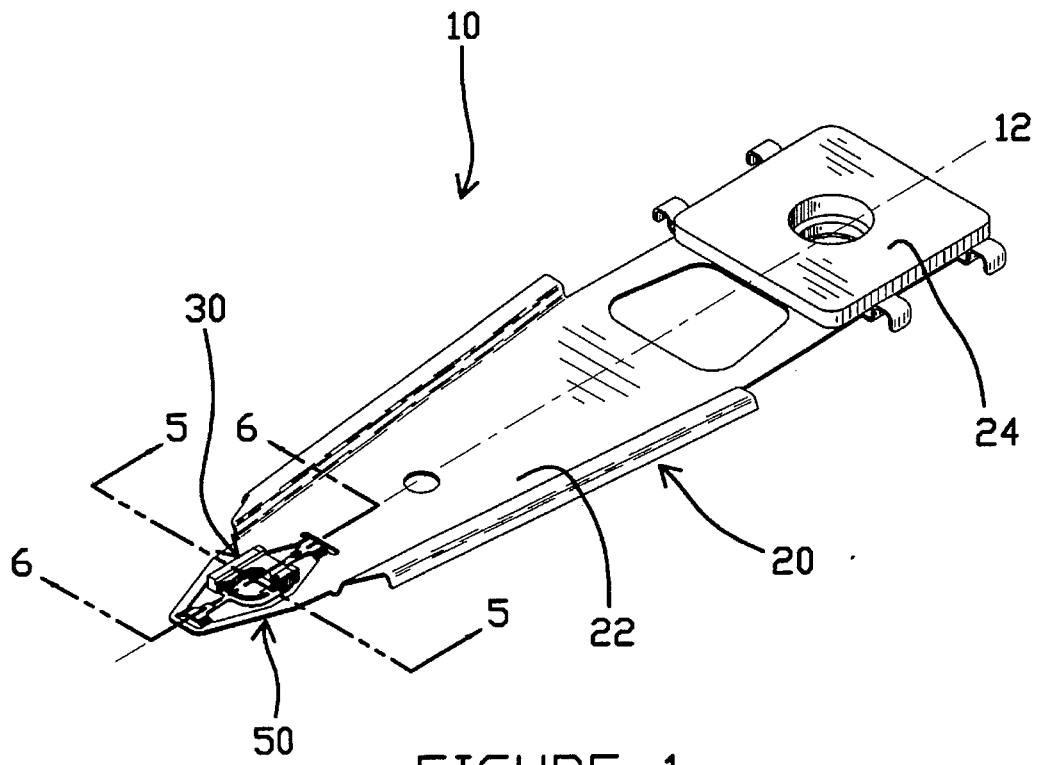
FIG. 1 is a perspective view of a first surface of a head suspension assembly in accordance with the present invention.
Figure 4:
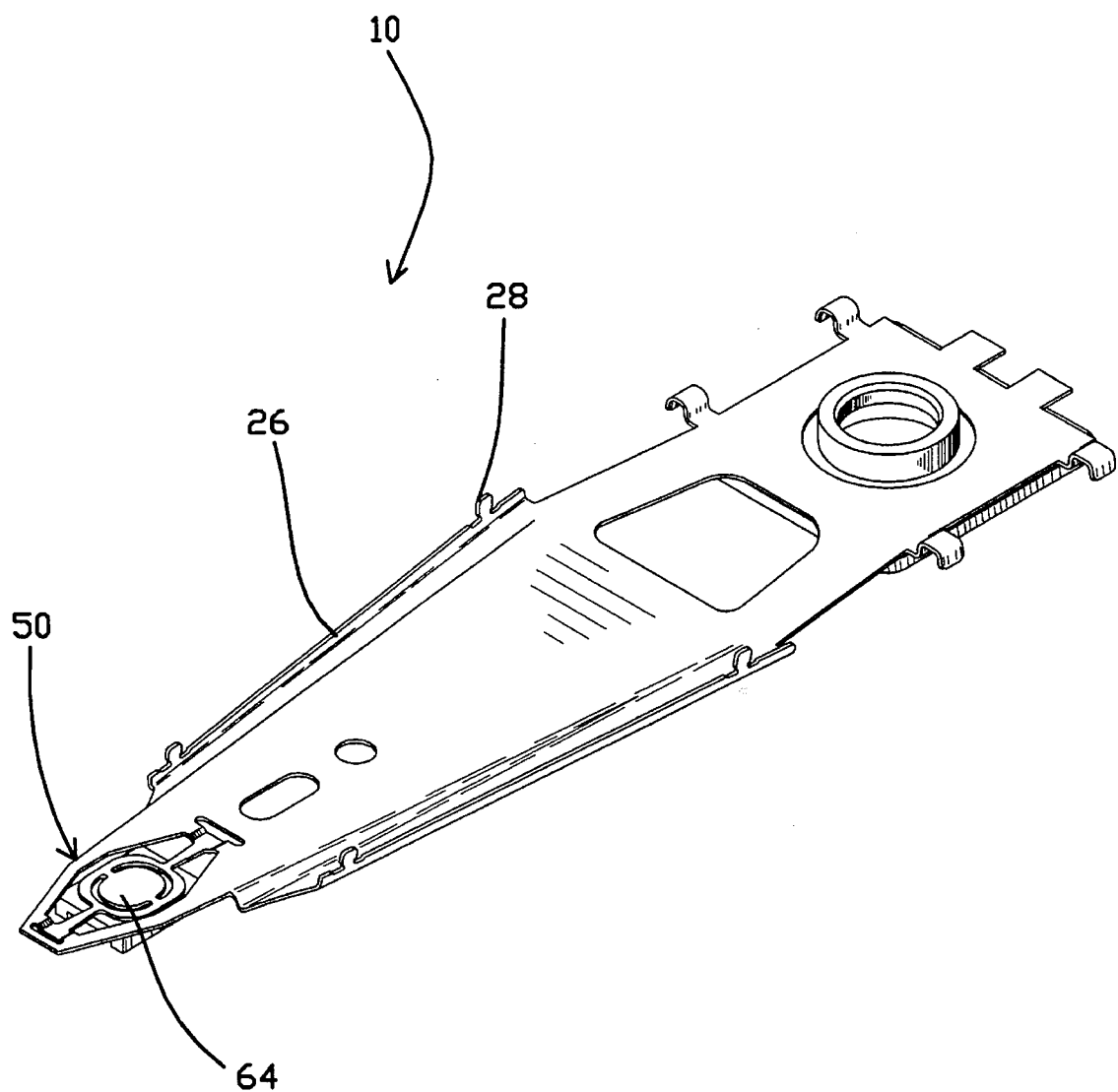
FIG. 4 is a perspective view of a second surface of the head suspension assembly of FIG. 1.

FIG. 1 shows the disk-facing surface of an assembled head suspension assembly (HSA) 10. FIG. 4 shows the other surface of the same HSA 10. The HSA 10 comprises a suspension assembly 20 and a head assembly 30. The length of the HSA 10 defines a longitudinal axis 12 that bisects the HSA 10 down the middle. The suspension assembly 20 usually includes a load beam 22 and a gimbal assembly 50. The proximal end of the suspension assembly 20 is reinforced by a base plate 24 that is configured for mounting to an actuator arm (not shown) used in some disk drives.

Figure 2:
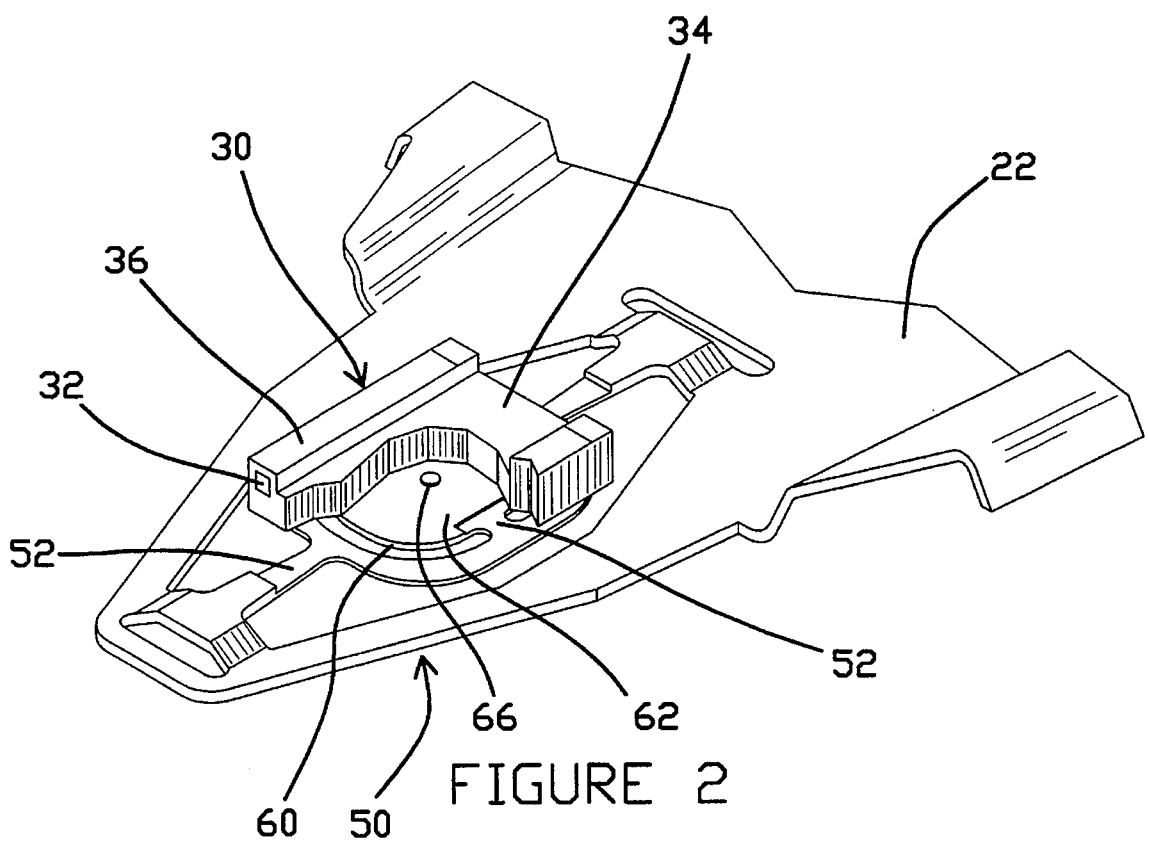
FIG. 2 is a detail perspective cut-away view of the gimbal of the head suspension assembly of FIG. 1.

FIG. 2 shows a detail cut-away view of the head assembly 30 attaching to gimbal 50. Gimbal 50 can be integrally connected to the load beam 22 or can be built as an independent element to be attached during HSA manufacture. The gimbal 50 is manufactured by etching a planar plate of a spring material, for example, stainless steel. Spring materials are those that do not plastically deform (yield) under the most extreme loads applied during HSA use.

The head assembly 30 includes a transducer 32, mounted to a slider 34 that has a disk facing air-bearing first major surface 36. The slider 34 has an opposite second surface 38 that attaches to a gimbal flexure platform 60.

Gimbal 50 is located at the distal end of the load beam 22. Gimbal 50 includes spring arms 52 supporting the flexure platform 60 over a central aperture. The flexure platform 60 is shaped and arranged to support the head assembly 30 and provide gimballing support.

Flexure platform 60 is a flat planar element and includes a first surface 62 and an opposite second surface 64, shown in FIG. 4. The first surface includes an etched protuberance 66 rising in the middle of the platform 60. Protuberance 66 is ovoid shaped. Unlike pressure-formed domes or dimples, protuberance 66 does not have an interior concave cavity, but is solid throughout. The flexure platform 60 is thicker at the apex of protuberance 66 than anywhere else. In other embodiments, protuberance 66 can be shaped as a raised rectangular tower or a semisphere.

Figure 3A:
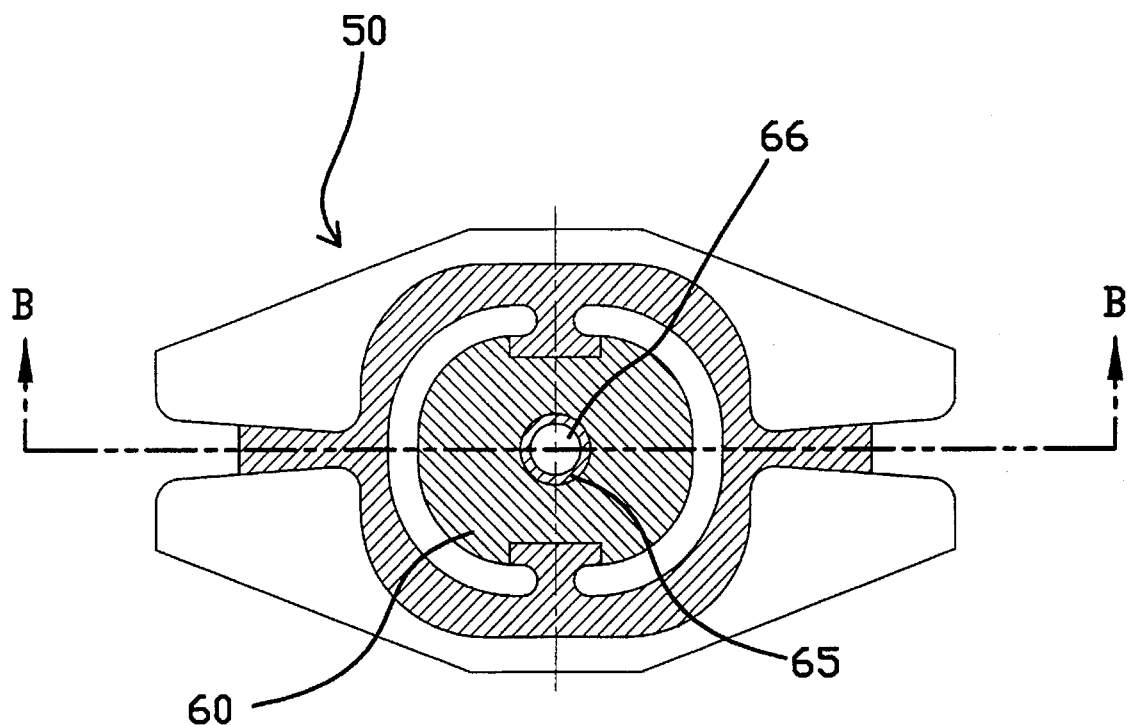
FIG. 3A is a plan view of the gimbal flexure platform of the gimbal of FIG. 2 including a raised etched tower.

FIG. 3A shows a plan view of the gimbal of FIG. 2. Protuberance 66 defines the pivot point of the pitch and roll axis of HSA 10. The pivot point is the actual point about which pitch and roll adjustments are made, the actual intersection of pitch and roll axis of movement. The pivot point is usually coincident with the geometrical intersection of the pitch axis and the roll axis of the slider 34. However, in some embodiments, the pivot point will be offset a few micrometers away from the geometrical intersection to compensate for different air stream speeds along the inner part and the outer part of the air bearing surface 36 of the slider 34.

Figure 3B:
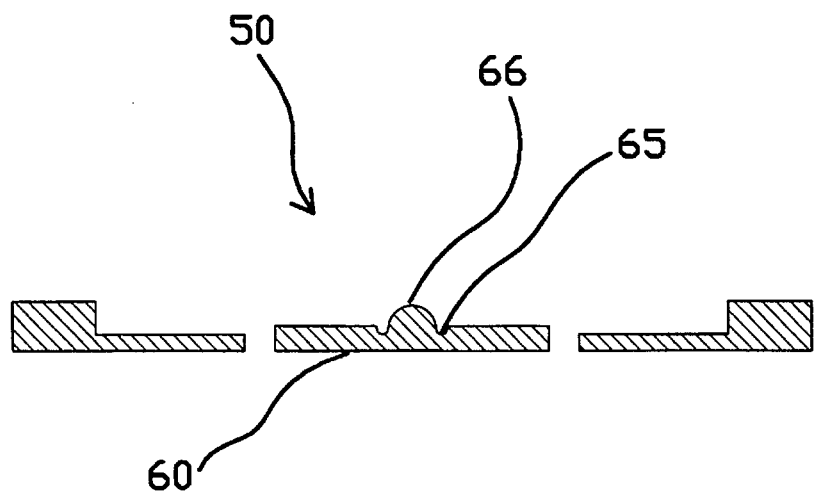
FIG. 3B is a view of a cross-sectional cut along lines B—B of FIG. 3A.

A surface cut along line B—B is illustrated in FIG. 3B. The process of manufacturing gimbal 50 includes a first step of chemically etching a plate of stainless steel. While apertures and outer outlines are etched through, features such as the spring arms 52 and flexure platforms 60 are partially etched to a more flexible reduced thickness. Protuberance 66 is shaped by masking a small point on flexure platform 60 while etching the gimbal 50 and leaving the raised protuberance 66 at full thickness or at only partially reduced thickness with respect to the rest of the platform 50. A ring 65 with the same depth as the spring arms 52 is etched around the protuberance 66. The ring 65 is shaped as a moat surrounding the protuberance 66 with reduced thickness. Etching of the ring 65 results in ease of processing when exposing and developing the photoresist and the subsequent etching process. The ring 65 also gives less variability to the placement of the protuberance 66.

FIG. 4 shows the second surface of gimbal 50 and of HSA 10. In the present embodiment, the whole suspension assembly is first etched out the same sheet of stainless steel. Specific features such as rails 26 or wire guides 28 are shaped by bending and/or pressing specific etched tabs.

Figure 5:
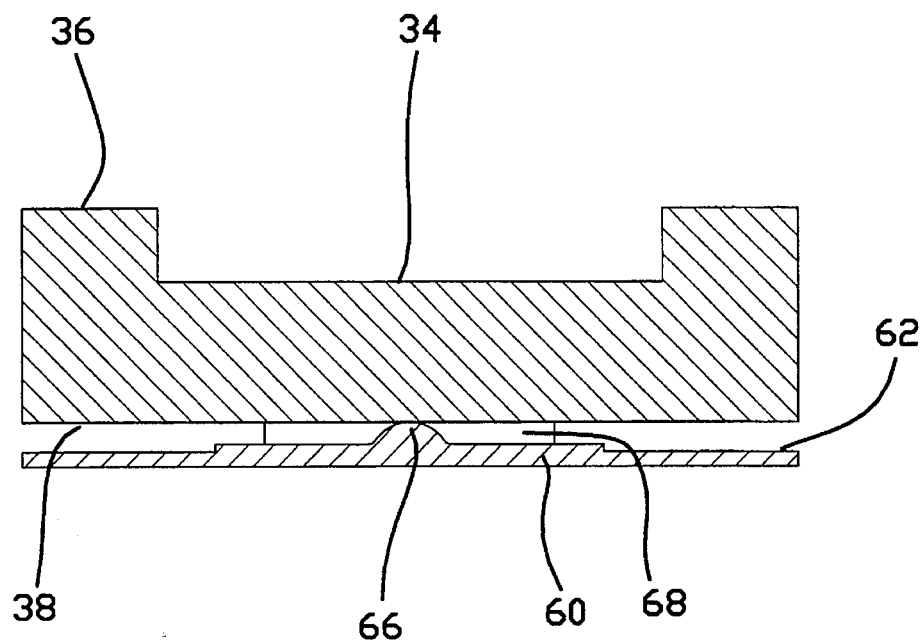
FIG. 5 is a view of a cross-sectional cut of the gimbal of the head suspension assembly of FIG. 1 along lines 5—5.
Figure 6:
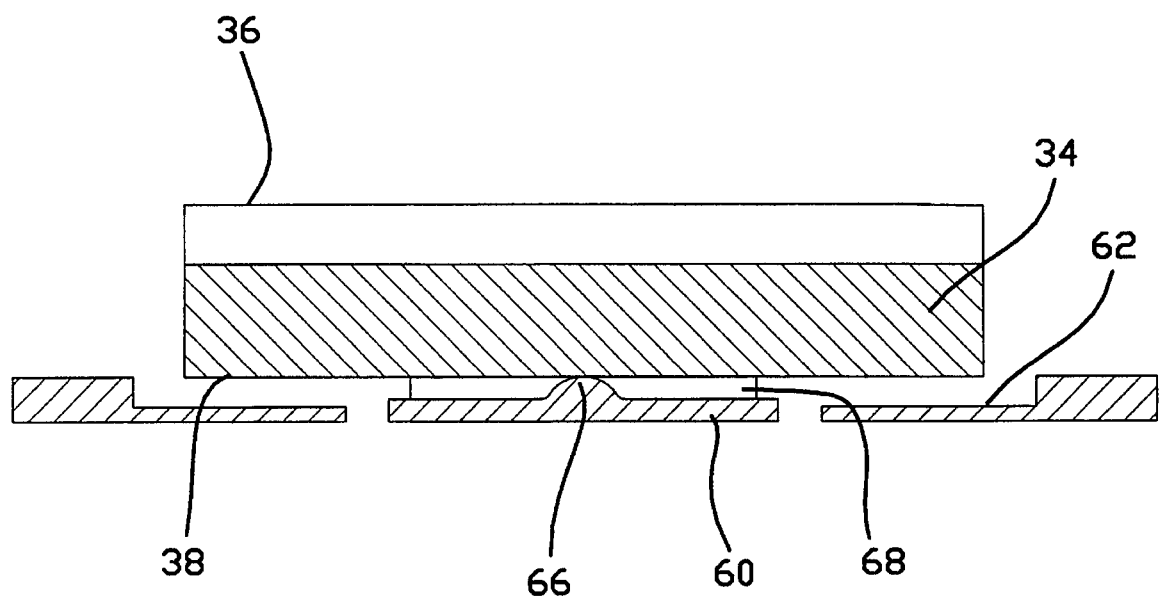
FIG. 6 is a view of a cross-sectional cut of the gimbal of the head suspension assembly of FIG. 1 along lines 6—6.

As seen in FIGS. 5 and 6, when coupling the slider 34 to the flexure platform 60, the protuberance 66 which protrudes ≈25 um from the first surface 62 provides a raised pivot interface to the second surface 38 of the slider 34 for eliminating adverse pitch and roll torques which normally result from pitch and roll static attitude errors. The second surface 38 of the slider 34 attaches to the platform 60 at the desired angle. Once the desired angle is achieved, adhesive 68 fills the space between the second surface 38 of the slider 34 and the flexure platform 60.

Figure 7:
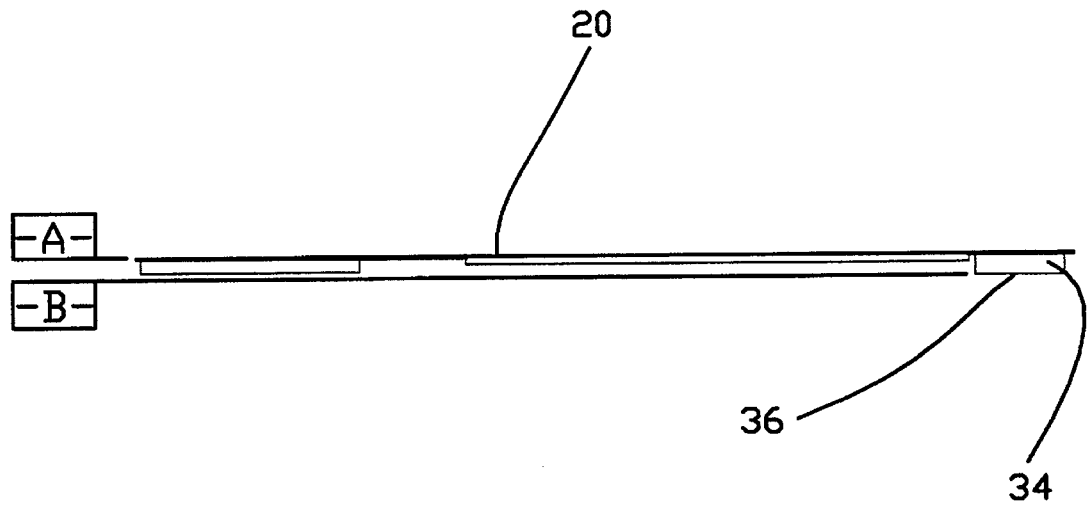
FIG. 7 is a surface view of the load beam positioned along surface datum plane -A- and of the slider positioned along surface datum plane -B-.
Figure 8:
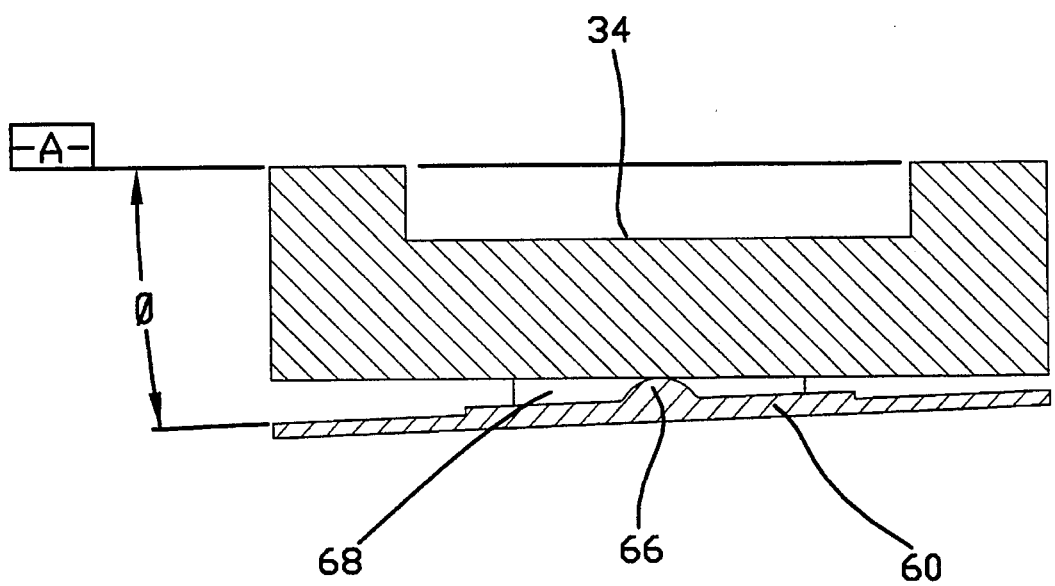
FIG. 8 is a view of a cross-sectional cut along line 5—5 in FIG. 1, wherein the etched tower feature serves as a pivot to compensate for desired relationship deviations.

During assembly of the HSA 10, the Reference Datum Planes -A- and -B-, shown in FIG. 7, are spaced a height Z and are positioned to achieve the desired relationship. The suspension assembly 20 is aligned on datum plane -A- and the air bearing first surface 36 of slider 34 rests on datum plane -B-. As shown in FIG. 8, the raised protuberance 66 serves as a pivot surface to allow for compensation along the pitch and roll axis necessary to achieve the desired relationship. Using the protuberance 66 as a swivel contact point, the nominal angle of the slider 34 can also be adjusted about either or both the pitch and roll axis.

In order to illustrate how the raised protuberance corrects for suspension static error, FIG. 8 shows adjustments to compensate for a misaligned or twisted flexure platform 60 along the roll axis. The plane of the flexure platform 60 is shown tilted an angle theta relative to the air bearing first surface 36 of the slider 34. The etched protuberance 66 and adhesive 68 fill the space between the slider 34 and the platform 60 to allow bonding at the twisted angle and prevent roll torque. The gimbal interface allows for similar positioning to compensate for both roll and pitch errors or to place the air-bearing surface 36 of the slider 34 at a desired nominal angle with respect to the surface of the disk. The resulting non-uniform bond line compensates for the non-planarity of the components and corrects static pitch and roll torque errors. The etched protuberance 66 provides a means of slider bonding which greatly reduces or entirely eliminates static pitch and roll torques due to static pitch and roll attitude errors and tolerances.

Figure 10A:
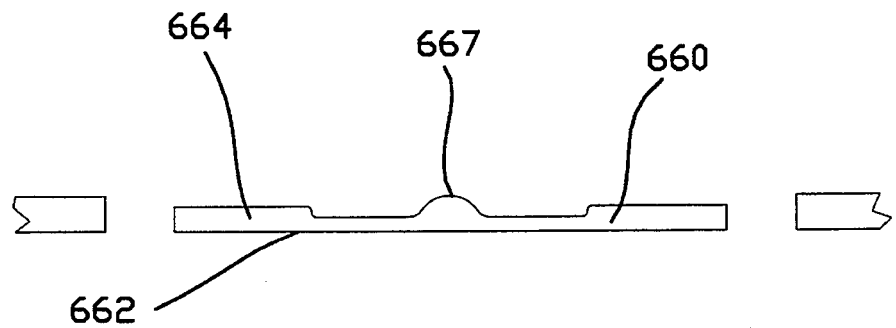
FIGS. 10A–D show views of a cross-sectional cut of a flexure platform during different steps in the manufacture of an embodiment of the present invention.
Figure 10B:
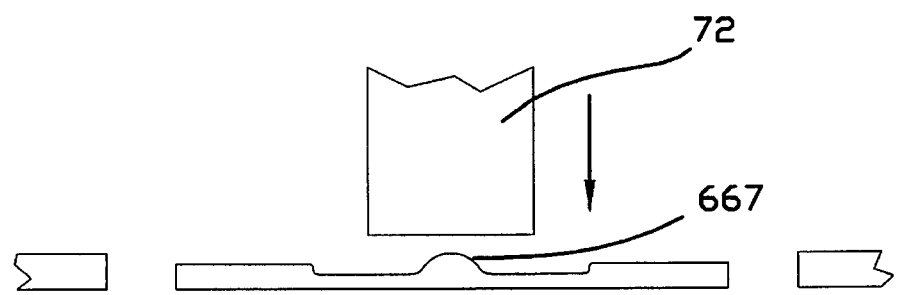
Figure 10C:
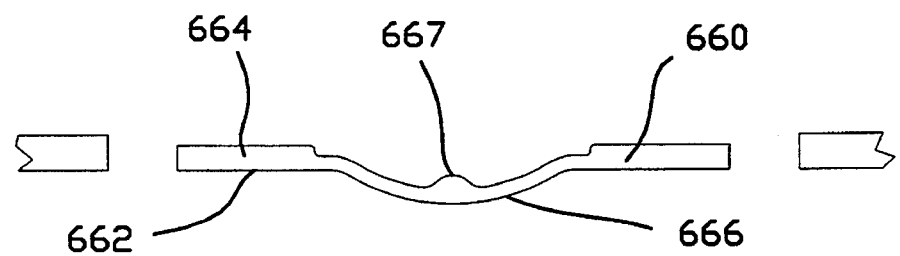
Figure 10D:
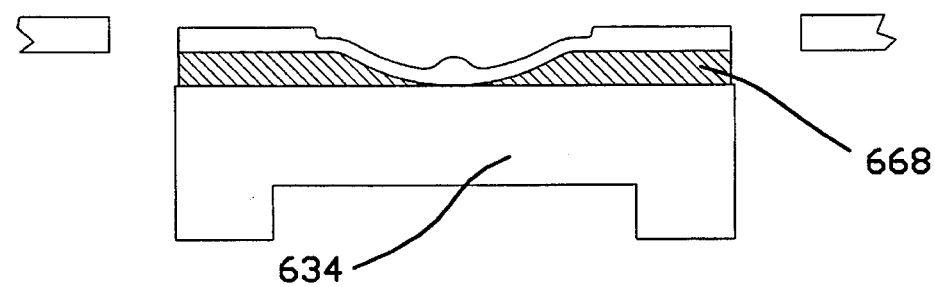
Figure 11A:
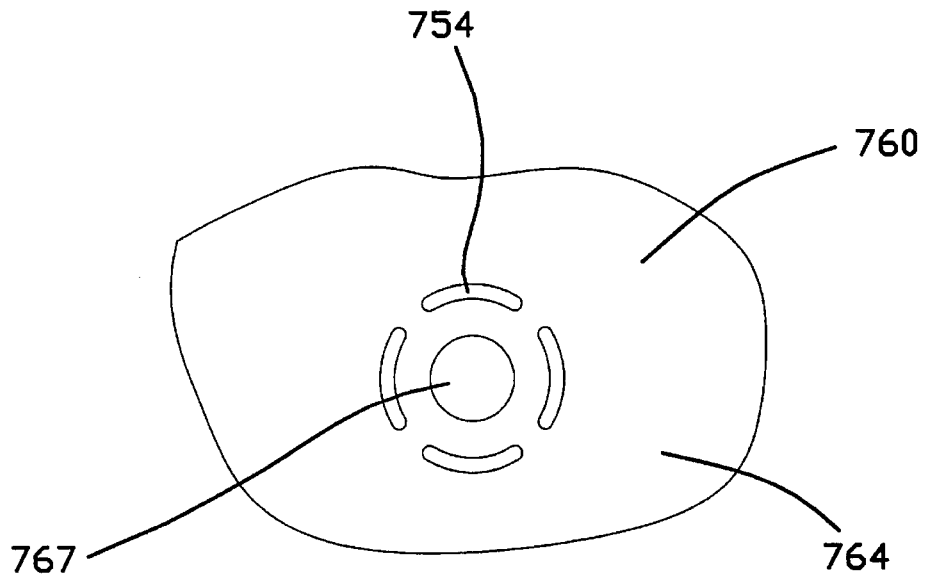
FIG. 11A shows a plan view of an etched tower and radial slots in accordance with the present invention.
Figure 11B:
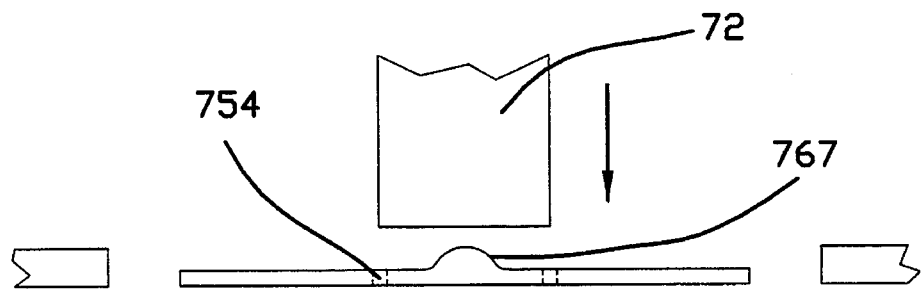
FIGS. 11B–C show different steps during the manufacturing process of the etched tower of FIG. 11A.
Figure 11C:
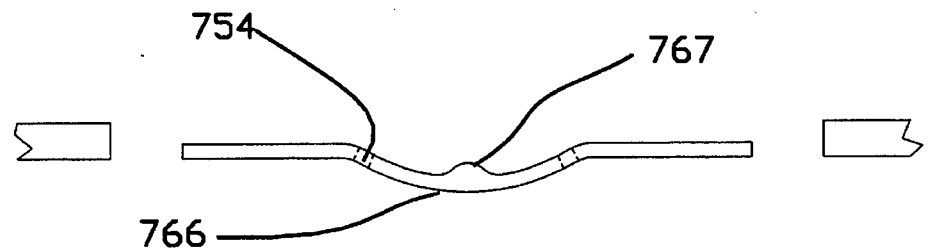

FIGS. 9–11 illustrate different steps in the manufacturing of different embodiments of the present invention. FIG. 9 illustrates the manufacture of an embodiment, HSA 510, including a flexure platform 560 having a first surface 562 and a second surface 564. The first step in the manufacturing process of the present embodiment comprises etching the gimbal platform including the raised protuberance 566. Etching provides more accurate positioning of protuberance 566 than forming processes. A cross-sectional cut of the flexure platform 560 after the etching step is shown in FIG. 9A. A round punch-press 70, shown in FIG. 9B, is then aligned with the vertical axis and applied against the second surface 564 to shape a dome or dimple 542. The raised ovoid protuberance 566 rises as a cupola from the apex of a dimple dome 542. FIG. 9D shows a slider 534 being attached at the correct angle to the flexure platform 560 by an adhesive fill 568.

Figure 9A:
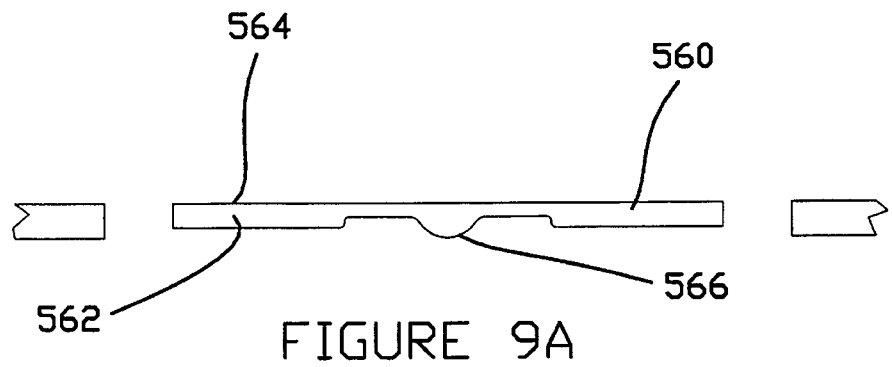
FIGS. 9A–D show views of a cross-sectional cut of a flexure platform during different steps in the manufacture of an embodiment of the present invention.
Figure 9B:
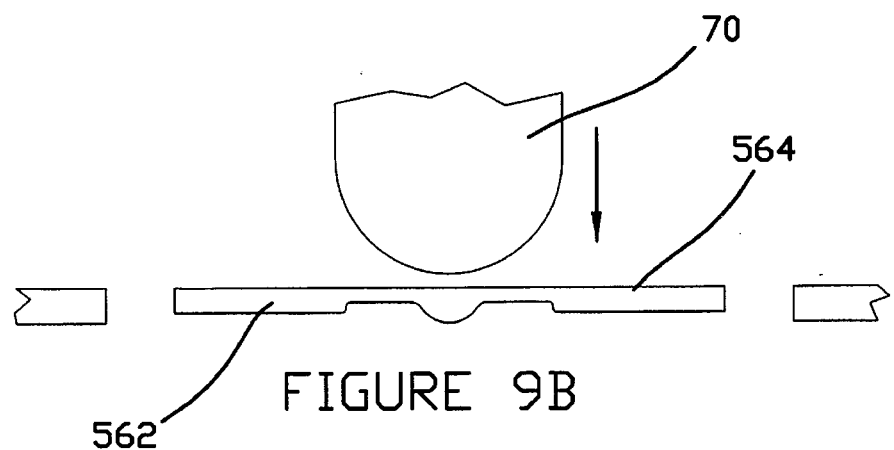
Figure 9C:
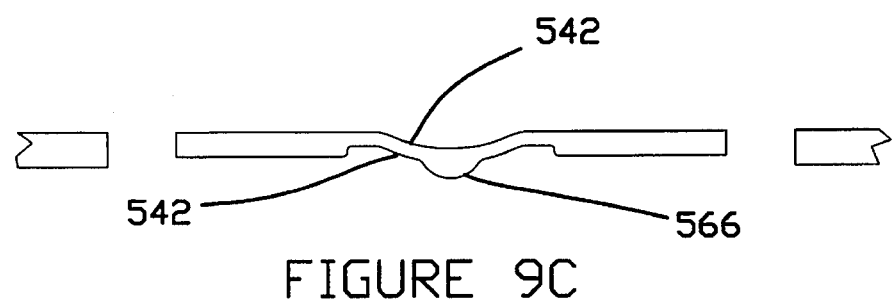
Figure 9D:
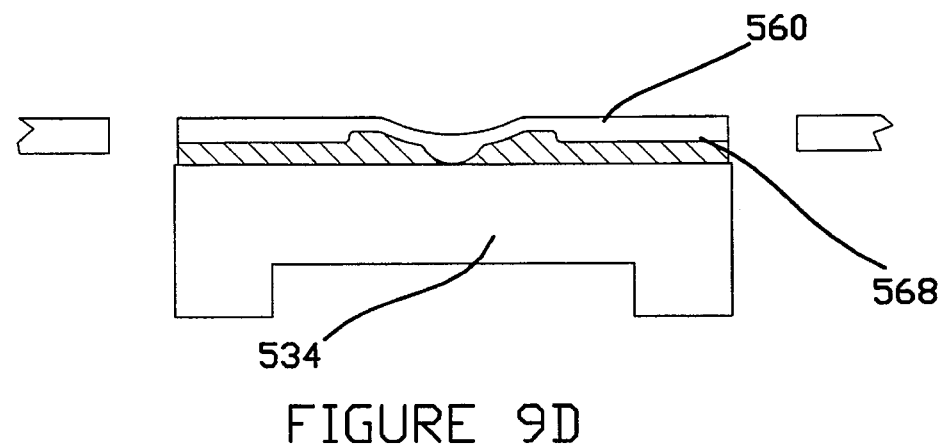
Figure 9E:
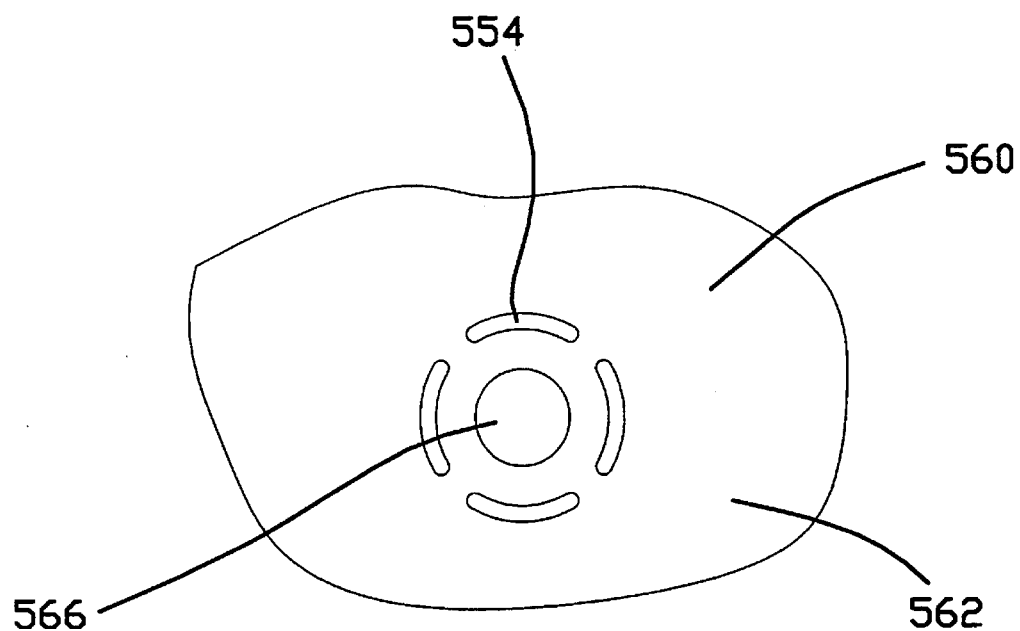
FIGS. 9E–F show the same flexure platform including concentric radial slots.
Figure 9F:
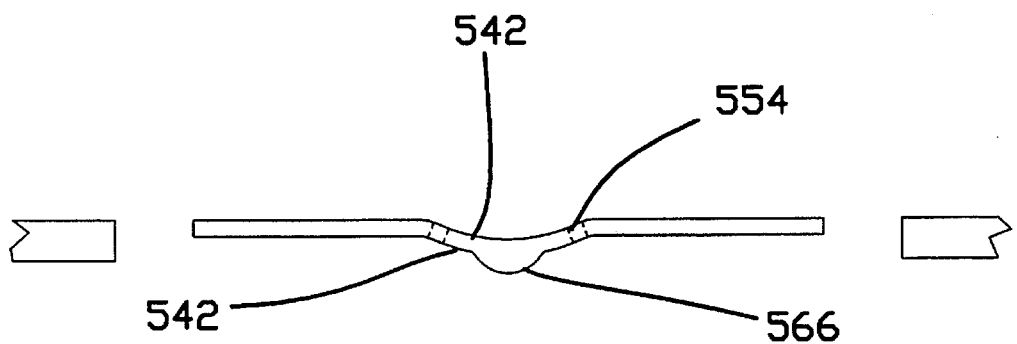

Radial concentric slots 554, shown in FIG. 9E can be etched partially or totally around the protuberance 566 prior to applying the punch press. The width and depth of the slots 554 will vary according to the desired size and shape of the dome 542. FIG. 9F shows the dome 554 after application of the punch press 70. The slots 554 help define and control the formed shape and size of the dome 542. The use of slots 554 results in better centering and less x-y variance in the positioning of the dome 542, its apex, and protuberance 566, with respect to traditional forming only techniques.

FIG. 10 illustrates manufacturing steps for another embodiment of the present invention. Gimbal flexure platform 660 is first chemically etched out of a plate of stainless steel. A raised control protuberance 467 on a second surface 664 of the platform 660 is etched by masking the spot during etching. FIG. 10A shows the control protuberance 667 after the etching process. A flat punch press 72, shown in FIG. 10B, is then applied to the control protuberance 667 with enough force to create a raised dome 666 on the first surface 662. The control protuberance 667 acts as a forming control feature that helps define the formation of the dome 666. FIG. 10C shows the resulting domed flexure platform 660. The control protuberance 667 allows the use of the flat press 72. Use of the flat press 72, rather than a curve press such as in FIG. 9, makes exact alignment of the apex of the press with the vertical axis less crucial. Finally, a slider 634 is attached at the correct angle by adhesive fill 668.

FIG. 11 illustrates manufacturing steps of another embodiment similar to the embodiment of FIG. 10. In FIG. 11A, the second surface 764 of the flexure pad 760 is shown in plan view. Flexure platform 760 includes radial slots 754 concentric with the vertical axis etched around a raised control protuberance 767. The slots 754 can be etched through or have reduced thickness with respect to the surface of the flexure platform 760. FIG. 11B shows a flat punch press 72 applied against the raised control protuberance 767. The punch press 72 creates another raised dome 766 on the first surface 762 of the flexure platform 760. Control protuberance 767 allows the use of the flat press 72 and helps define the shape of the dome 766. The slots 754 control the deformation of the dome 766 during the punching process and help define the shape and size of the dome 766.

Figure 12:
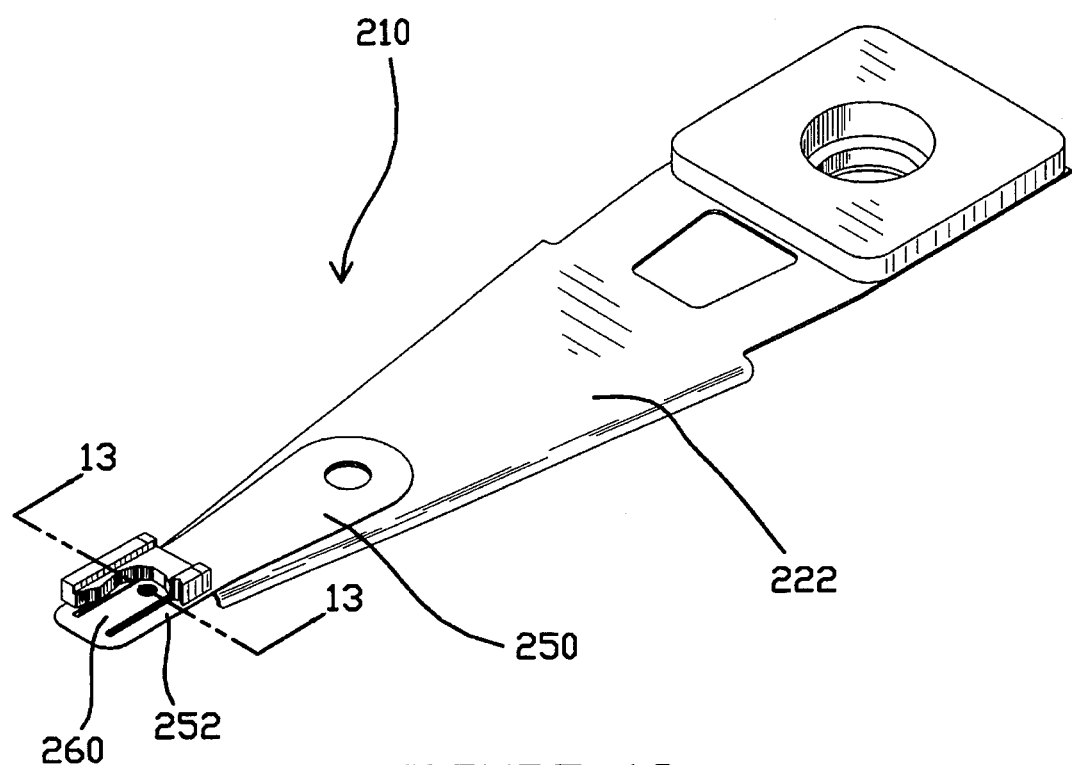
FIG. 12 is a perspective view of a head suspension assembly in accordance with the present invention.

FIG. 12 shows a second embodiment of an HSA 210 in accordance with the present invention. The embodiment includes a gimbal plate 250 attached to and extending past the distal end of load beam 222. The gimbal plate 250 includes a rectangular flexure platform or tongue 260 suspended at its distal end by two spring arms 252. As better seen on FIG. 13, a cross-sectional cut along line A—A, platform 260 has a disk-facing first surface 262 and a second surface 264. A load beam cover 240 extends from the distal end of the load beam 222, opposite the second surface 264 of platform 260. The cover 240 can be an integral projection of the load beam 222, such as the rectangular "T" projection of the present embodiment, or can be a separate element attached (by adhesive, welds, or other methods known in the art) to the load beam 222. The gimbal plate 250 also can be an integral projection of the load beam 222 or can be a separate element attached (by adhesive, welds, or other methods known in the art) to the load beam 222. The cover 240 extends over a portion of the flexure platform 260 and over the etched protuberance 266.

Figure 13:
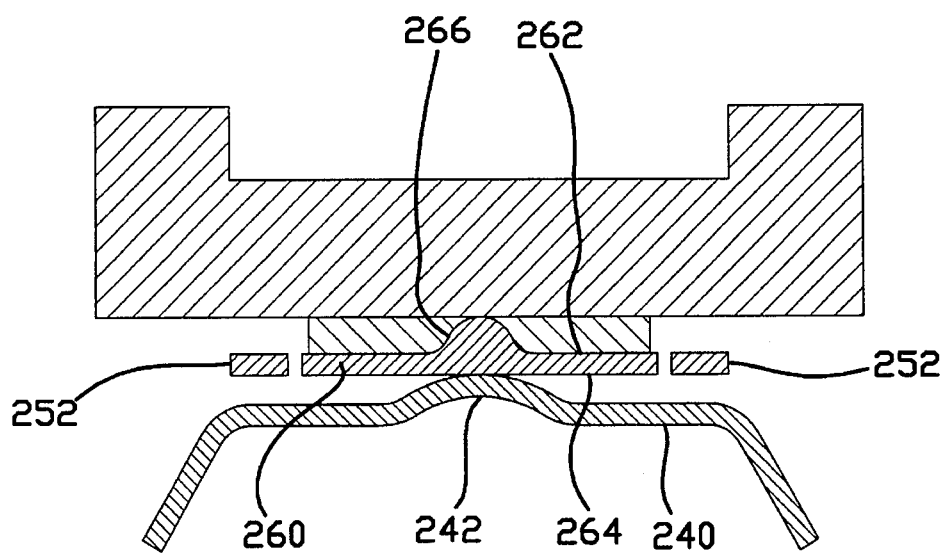
FIG. 13 is a view of a cross-sectional cut along line A—A in FIG. 12.

As seen in FIG. 13, the cover 240 includes a punch-pressed dimple 242 (a load point feature) that contacts the second surface 264 of the flexure platform 260 and presses against it, thus defining the load point. The punch-pressed dimple 242 is aligned along the same vertical axis as the protuberance 266.

Figure 14:
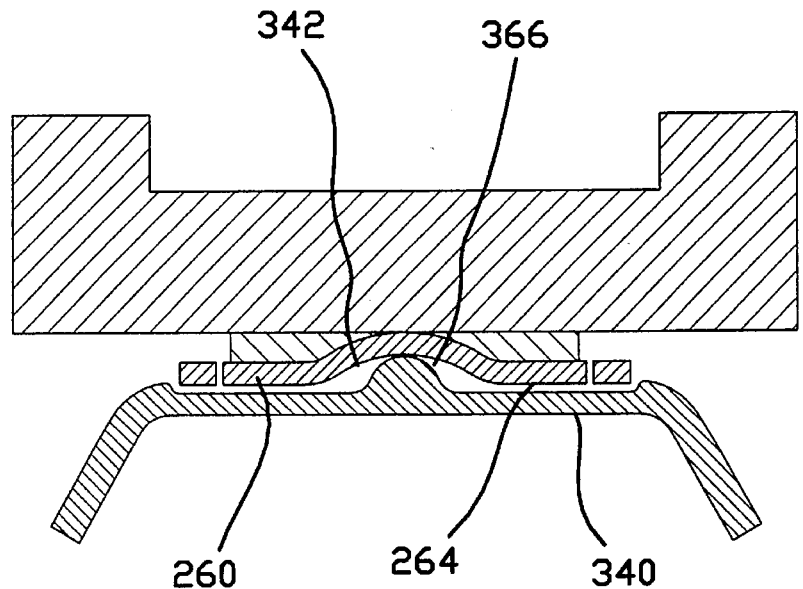
FIG. 14 is a view of a cross-sectional cut along line A—A of an embodiment of a head suspension assembly similar to the embodiment of FIG. 12.

In the embodiment shown in FIG. 14, the cover 340 includes an etched protuberance 366, while the flexure platform includes a punched dimple 342. The corresponding concave surface of the dimple 342 accommodates the protuberance 366 and allows for the proper static attitude compensation. In still other embodiments, such as that of FIG. 9, the dome 542 is capped by another protuberance to allow for greater attitude compensation clearance.

Figure 15:
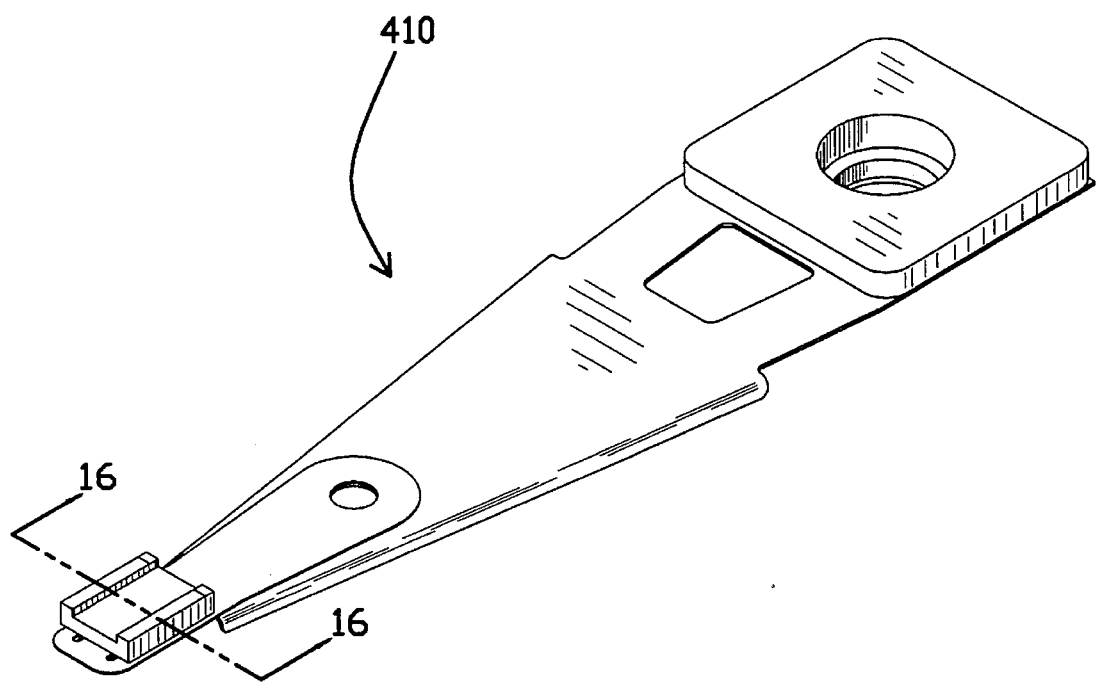
FIG. 15 is a perspective view of an embodiment of a head suspension assembly in accordance with the present invention.
Figure 16:
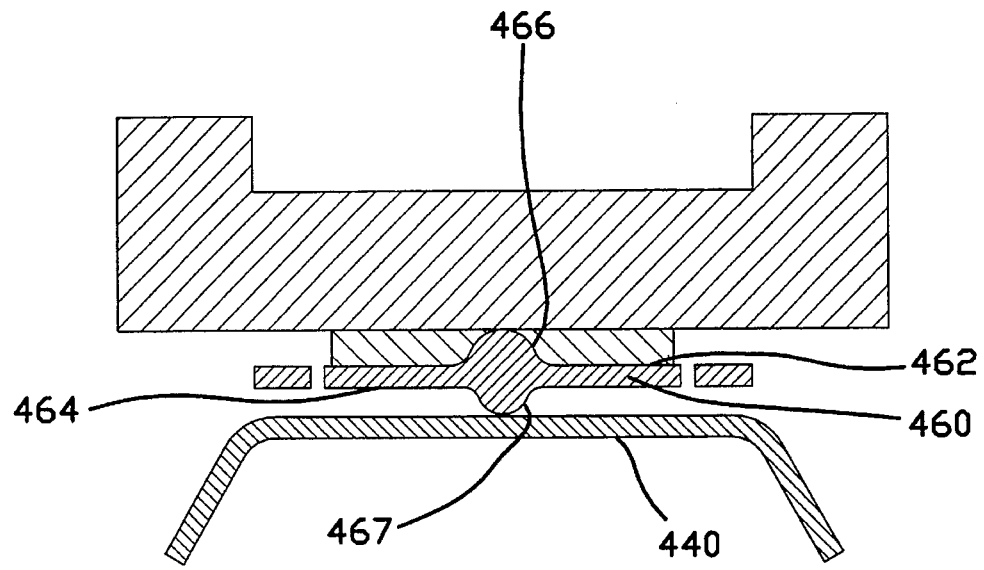
FIG. 16 is a view of a cross-sectional cut along line B—B in FIG. 15.

The HSA 410 of FIG. 15 is similar to the HSA 310 of FIG. 12. FIG. 16, a cross-sectional cut along line B—B, shows cover 440 pressing against a flexure platform 460. Flexure platform 460 includes two oppositely aligned raised etched protuberances 466 and 467. Both protuberances are aligned along the same vertical axis that is orthogonal to the pitch axis and the roll axis. First protuberance 466 rises from a first surface 462 of the flexure platform 460, while second protuberance 467 rises from the second surface 464 of flexure platform 460. In the present embodiment, the first protuberance 466 acts as a static attitude compensation and adjustment feature, while the second protuberance 467 acts as a load beam interface load point feature. Use of the second protuberance 467 as a load point feature eliminates accuracy and manufacturing concerns of exactly aligning a separate load point feature on the load beam cover 440 with the vertical axis and the first protuberance 466.

The etching and the etching-forming procedures provide exceptional positioning accuracy and centering for the static attitude compensation and load point features. The described manufacturing processes can be applied to the manufacture of very accurate load point features as well as attitude compensation features.

Figure 17:
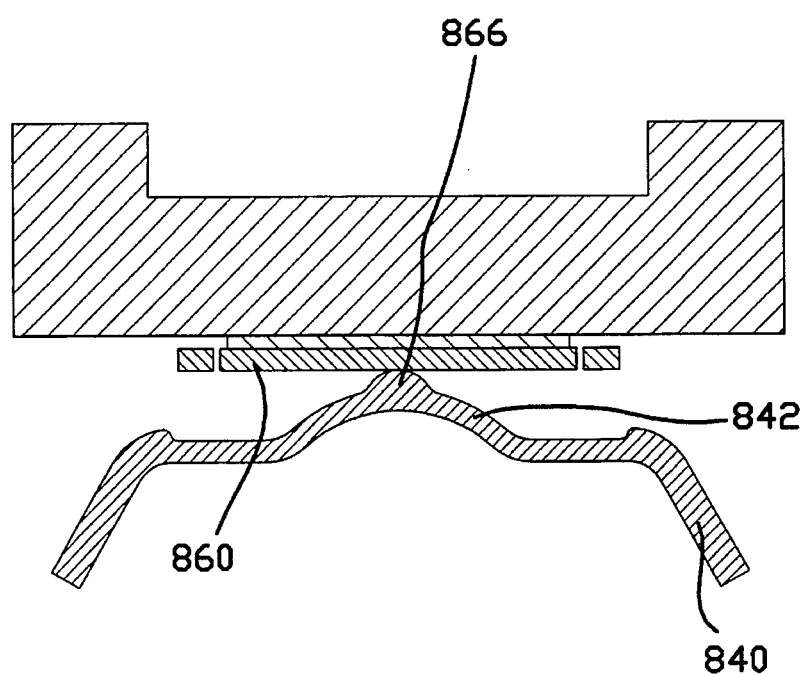
FIG. 17 is a view of a cross-sectional cut along line A—A of an embodiment of a head suspension assembly similar to the embodiment of FIG. 12.

FIG. 17 shows a cross-sectional cut along line A—A of an embodiment of a head suspension assembly similar to the embodiment of FIG. 12. Cover 840 includes a formed raised dome 842 capped at its apex by an etched protuberance 866. The cover 840 is manufactured by the processes illustrated in FIGS. 9A–F. The x-y positioning variance of protuberance 866 is minimal, and the raised dome 842 gives the load point feature added offset clearance for static attitude compensation and nominal angle adjustment.

Another embodiment (not shown) includes a load beam cover with a cross-section similar to that of the flexure platform 660 shown in FIG. 10C. The cover includes a first surface facing a flexure platform, the surface having a raised dome. The second surface of the cover includes an inside concave surface with a protuberance. Following the same general etching-shaping process applied to the embodiment of FIG. 10, the cover is first etched, leaving the raised central protuberance aligned along the vertical axis on the second surface. Concentric slots can be etched around the protuberance. A flat punch press is applied to the protuberance, thus creating the raised dome. The dome then acts as a load point feature.

The invention is not to be taken as limited to all of the details thereof as modifications and variations thereof may be made without departing from the spirit or scope of the invention.

What is claimed is:

1. A head suspension assembly for supporting a head assembly at a predetermined flying attitude with respect to the surface of a rotatable data storage device, the head suspension assembly comprising:

a load beam comprising an elongated spring structure;

a head assembly including a transducer and a slider;

a gimbal located at the distal end of the load beam, the gimbal including a resilient and planar load bearing flexure platform which is able to flex to permit the slider to move in pitch and roll directions during operation over a disk surface, said flexure platform having a slider-engaging first surface and a second opposite surface, and wherein the platform is etched to leave an integral solid static attitude compensation protuberance extending from the first surface with a corresponding flat portion of said second opposite surface; and a layer of adhesive for bonding the slider to the first surface of the flexure platform, wherein the static attitude compensation protuberance contacts the slider, and the adhesive fills interstitial spaces between the slider and the platform which have been formed by the contact between the static attitude compensation protuberance and the slider to prevent pitch and roll movements about the static attitude protuberance during operation over a disk surface and rigidly hold the slider at a desired static attitude with respect to the first surface of the flexure platform.

2. The head suspension assembly of claim 1, the flexure platform of the gimbal further including an etched integral solid load point protuberance on the second surface, the load point protuberance extending from the second surface.

3. The head suspension assembly of claim 4 wherein the flexure platform further includes a dome surrounded by the ring and having a convex surface extending from the first surface of the flexure platform, and wherein the static attitude compensation protuberance rises from the convex surface of the dome.

4. The head suspension assembly of claim 1, the flexure platform of the gimbal further including a ring etched around the static attitude compensation protuberance.

5. The head suspension assembly of claim 1, further comprising a load point cover, the load point cover located on the distal end of the load beam and engaged with at least a portion of the second surface of the flexure platform.

6. The head suspension assembly of claim 5, wherein the load point cover includes a convex dome engaged with the second surface of the flexure platform.

7. The head suspension assembly of claim 1 wherein the flexure platform further includes a dome having a convex surface extending from the first surface of the flexure platform, and wherein the static attitude compensation protuberance rises from the convex surface of the dome.

* * * * *

UNITED STATES PATENT AND TRADEMARK OFFICE
CERTIFICATE OF CORRECTION

PATENT NO. : 5,608,590
DATED : March 4, 1997
INVENTOR(S) : Ziegler, et. al.

It is certified that error appears in the above-indentified patent and that said Letters Patent is hereby corrected as shown below:

Title page, item [54], line 2, delete "PRINT" and insert therefor --POINT--.
Title page, item [54], line 3, delete "INTREGAL" and insert therefor --INTEGRAL--.

Signed and Sealed this

First Day of July, 1997

Attest:

Attesting Officer

BRUCE LEHMAN

Commissioner of Patents and Trademarks